United States Patent
Funada

[19]
[11] Patent Number: 6,118,891
[45] Date of Patent: *Sep. 12, 2000

[54] FINGERPRINT/PALMPRINT IMAGE PROCESSING APPARATUS

[75] Inventor: Junichi Funada, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/261,147

[22] Filed: Mar. 3, 1999

Related U.S. Application Data

[62] Division of application No. 08/764,239, Dec. 16, 1996, Pat. No. 5,937,082.

[30] Foreign Application Priority Data

Dec. 18, 1995 [JP] Japan .................................. 7-328690

[51] Int. Cl.⁷ ...................................................... G06K 9/00
[52] U.S. Cl. ............................................ 382/125; 382/225
[58] Field of Search ................................. 382/125, 204, 382/225

[56] References Cited

U.S. PATENT DOCUMENTS

| | | | |
|---|---|---|---|
| 4,547,898 | 10/1985 | Tsikos | 382/204 |
| 4,747,147 | 5/1988 | Sparrow | 382/204 |
| 5,426,708 | 6/1995 | Hamada et al. | 382/125 |
| 5,631,971 | 5/1997 | Sparrow | 382/125 |

FOREIGN PATENT DOCUMENTS

| | | |
|---|---|---|
| 0 646 886 | 4/1995 | European Pat. Off. . |
| 0 685 815 | 12/1995 | European Pat. Off. . |
| 5-746 | 1/1993 | Japan . |
| 5-181956 | 7/1993 | Japan . |
| WO 87/07058 | 11/1987 | WIPO . |

OTHER PUBLICATIONS

Kawasaki et al., "Classification of Fingerprint Patterns by Relaxation Method", The 22nd National Convention (1981 First Term Session).

Primary Examiner—Bhavesh Mehta
Attorney, Agent, or Firm—Foley & Lardner

[57] ABSTRACT

A local information extracting portion 11 extracts a plurality of ridge line candidate images for each of local regions into which an image has been divided. A first ridge line candidate image selecting portion 12 selects a first ridge line candidate image that has high likelihood of a ridge line for each local region. A connectivity evaluating portion 13 evaluates the connectivity of first ridge line candidate images between each local region. A clustering portion 14 clusters local regions corresponding to the evaluated result of the connectivity evaluating portion 13 and generates a local region group. A cluster evaluating portion 15 determines an initial local region group that is a local region group having high likelihood of a ridge line. A ridge line image restoring portion 16 outputs a first ridge line candidate image for each local region that is included in the initial local region group. In addition, the ridge line image restoring portion 16 outputs an optimum ridge line candidate image for each local region that is not included in the initial local region group as the extracted result of a ridge line.

10 Claims, 6 Drawing Sheets

FINGERPRINT/PALMPRINT IMAGE PROCESSING APPARATUS

This application is a divisional of application Ser. No. 08/764,239, filed Dec. 16, 1996, now U.S. Pat. No. 5,937,082.

BACKGROUND OF THE INVENTION

1. Field of the Invention

The present invention relates to an image processing apparatus for identifying fingerprints and palmprints, in particular, an image processing apparatus for acquiring ridge line images from skin pattern images.

2. Description of the Related Art

As a method for extracting a ridge line image from a skin pattern image, a technology disclosed as for example Japanese Patent Examined Publication No. 5-746 titled "Fingerprint Image Coding Method" is known. In the fingerprint image coding method, a fingerprint image is divided into small regions. For each small region, two-dimensional Fourier transformation is performed. With information of each transformed plane, features of the fingerprint image are extracted.

In addition, to remove the influence of noise against an image, a method for smoothing features of a ridge line has been disclosed in Japanese Patent Laid-Open Publication No. 5-181956 titled "Method for Smoothing Ridge Line Pattern and Apparatus Thereof" by Kamei and in "Classification of Fingerprint Patterns by Relaxation Method", the 22nd National Convention (1981 First Term Session), Information Processing Society of Japan by Kawakoshi et. al. The "Method for Smoothing Ridge Line Pattern and Apparatus Thereof" describes a technique based on the theory of minimizing energy. An evaluation function is assigned for an extracted direction for each two-dimensional local region of an image with a scale of reliability. By minimizing the evaluation function, the ridge line pattern is smoothed. On the other hand, in the "Classification of Fingerprint Patterns by Relaxation Method," information of directions extracted for each two-dimensional local region of an image is smoothed by so-called relaxation method.

In the technique described in Japanese Patent Examined Publication No. 5-746, since an image divided into local regions is processed, if a fingerprint/palmprint image locally deteriorates, the deteriorated image should be interpolated with information of adjacent local regions. However, in this related art reference, such an interpolating process is not performed. Thus, the fingerprint/palmprint image cannot be accurately obtained.

On the other hand, in the technique described in Japanese Patent Laid-Open Publication No. 5-181956, a sum of the sum $E_1$ of differences between each local region of features of a ridge line extracted for each local region in the entire local regions and the weighted sum $\alpha E_2$ of the reliability of which the features of the ridge line are extracted from each local region is defined as an energy function. The weighted sum can expressed by Formula 1. The energy function is minimized so as to smooth the ridge line pattern.

$$E = E_1 + \alpha E_2 \text{ (where } \alpha < 0\text{)} \quad \text{[Formula 1]}$$

However, if the above-described method is applied for wrinkles that frequently extend and go side by side at equal pitches in the wide range of a palm, the following problem will take place.

Such wrinkles have relatively good connectivity of features such as directions and pitches with adjacent regions, when components of wrinkles are selected, the entire energy may decrease. Where wrinkles are clearly present, the reliability for extracting features of ridge lines occasionally increases. Thus, when an image including such wrinkles is smoothed, the adjacent regions matched to the wrinkles thereof are also smoothed. Consequently, the wrinkles may be emphasized. In addition, it is difficult to define the energy function E that allows the above-described problem to be solved.

In the technique described in "Categorizing Fingerprint Patterns by Relaxation Method," the relaxation method is used as a technique for smoothing information with respect to directions extracted for individual local regions. Even in this technique, wrinkles that frequently extend and go side by side at equal pitches on a palmprint are smoothed such as matched to the wrinkle and emphasized.

SUMMARY OF THE INVENTION

An object of the present invention is to provide an image processing apparatus for correctly extracting ridge lines of fingerprints from an image that includes wrinkles that extend at the same pitches of the ridge lines of fingerprints and each go side by side with.

The present invention is a fingerprint/palmprint image processing apparatus for extracting ridge lines from an input fingerprint/palmprint image, comprising a local information extracting means for dividing the fingerprint/palmprint image into two-dimensional local regions and extracting in each of the two-dimensional local region a plurality of ridge line candidate images that represent ridge lines from each of the two-dimensional local regions, a first ridge line candidate image selecting means for evaluating the likelihood of a ridge line for each of the ridge line candidate images in each of the two-dimensional local regions, and selecting one first ridge line candidate image that represents a ridge line candidate image with the maximum likelihood of a ridge line from ridge line candidate images in each of the two-dimensional local regions, a connectivity evaluating means for evaluating the connectivity of first ridge line candidate images in adjacent two-dimensional local regions, a clustering means for clustering two-dimensional local regions that have high connectivity of first ridge line candidate images corresponding to the determined result of the connectivity evaluating means and generating a local region group, a cluster evaluating means for evaluating the likelihood of a ridge line for the first ridge line candidate image in each of the two-dimensional local regions included in the local region group generated by the clustering means and determining a local region group that has high likelihood of a ridge line as an initial local region group, and a ridge line image restoring means for outputting the first ridge line candidate image in each of local regions included in the initial local region group as a ridge line image.

The present invention has an optimum ridge line candidate image selecting means for evaluating the connectivity of the first ridge line candidate image in each of the two-dimensional local regions included in the initial local region group and a plurality of ridge line candidate images in each of the two-dimensional local regions that are not included in the initial local region group, selecting one ridge line candidate image with the highest connectivity from ridge line candidate images in each of the two-dimensional local regions that are not included in the initial local region group as an optimum ridge line candidate image, and selecting a first ridge line candidate image in each of the two-dimensional local regions that are included in the initial local region group as an optimum ridge line candidate image, wherein the ridge line image restoring means outputs the optimum ridge line candidate image as a ridge line image.

The present invention has a control means for supplying the optimum ridge line candidate image as a first ridge line candidate image to the connectivity evaluating means and the cluster evaluating means and controlling cyclical executions of processes of the connectivity evaluating means, the clustering means, the cluster evaluating means, and the optimum ridge line candidate image selecting means.

The local information extracting means performs two-dimensional Fourier transformation for each of the two-dimensional local regions, extracts a plurality of peaks corresponding to two-dimensional sine waves on the resultant Fourier transformation plane in the order of the largest amplitude or the largest energy in the vicinity of peaks, treats two-dimensional sine waves corresponding to the peaks as ridge line candidate images.

The first ridge line candidate image selecting means determines a ridge line candidate image with the largest amplitude in each of the two-dimensional local region as the first ridge line candidate image.

The connectivity evaluating means evaluates the connectivity of the first ridge line candidate images with at least one, or more, or all of:

(a) the difference of the directions of two-dimensional sine waves that represent the first ridge line candidate images in each adjacent two-dimensional local regions, (b) the difference of the phases of two-dimensional sine waves that represent the first ridge line candidate images in each adjacent two-dimensional local regions, (c) the difference of the pitches of two-dimensional sine waves that represents the first ridge line candidate images in each adjacent two-dimensional local regions, and (d) the difference of the pixel values of sides of which adjacent two-dimensional local regions contact of sine waves that represent the first ridge line candidate images in each adjacent two-dimensional local regions.

The cluster evaluating means evaluates a grade of the likelihood of a ridge line in each of the local region groups corresponding to at least one of:

(e) the number of two-dimensional local regions included in each of the local region groups, (f) the sum of the evaluated amount of the connectivity of first ridge line candidate images between adjacent two-dimensional local regions for each of the local region groups, (g) the quotient of which the sum of the energy of the first ridge line candidate image in each of the two-dimensional local regions for each of the local region groups is divided by the sum of the energy of the fingerprint/palmprint image corresponding to each of the two-dimensional local regions for each of the local region groups, and (h) the quotient of which the sum of the energy of the first ridge line candidate image in each of the two-dimensional local regions for each of the local region groups is divided by the sum of the energy of a ridge line candidate image with the maximum energy in the ridge line candidate images other than the first ridge line candidate images for each of the local region groups.

The optimum ridge line candidate image selecting means successively selects the optimum candidate images from two-dimensional local regions that are not included in the initial local region groups in the order of the smallest distance with two-dimensional local regions that are included in the initial local region groups.

When selecting an optimum candidate image, the optimum ridge line candidate image selecting means, (i) evaluates the connectivity of the first ridge line candidate image in each two-dimensional local region that is adjacent to each two-dimensional local region from which an optimum ridge line candidate image is selected and that is included in each of the initial local region groups and each of ridge line candidate images in each two-dimensional local region from which the optimum ridge line candidate image is selected corresponding to at least one of the difference of the directions of two-dimensional sine waves that represent the ridge line candidate images, the difference of the pitches thereof, the difference of the phases thereof, and the difference of the pixel values of boundary portions of the two-dimensional local regions, (j) evaluates the connectivity of an optimum candidate image in each of two-dimensional local regions in which an optimum ridge line candidate images have been selected and that is adjacent to each two-dimensional local region from which an optimum ridge line candidate image is selected and each of ridge line candidate images in each of two-dimensional local regions from which an optimum ridge line candidate image is selected corresponding to at least one of the difference of the directions of two-dimensional sine waves that represent the ridge line candidate images, the difference of the pitches thereof, the difference of the phases thereof, and the difference of the pixel values of boundary portions of the two-dimensional local regions, (k) evaluates the connectivity of a first ridge line candidate image in each of two-dimensional local regions included in each of initial local region groups in which the distance between the two-dimensional local regions from which the optimum candidate image is selected is smaller than a predetermined threshold value and each of ridge line candidate images in each of two-dimensional local regions from which an optimum candidate image is selected, corresponding to at least one of the average of the difference of the directions of two-dimensional sine waves that represent each of the ridge line candidate images and the average of the difference of the pitches thereof, (l) evaluates the connectivity of an optimum ridge line candidate image in each of two-dimensional local regions in which an optimum candidate image has been selected and in which the distance between the two-dimensional local regions from which the optimum candidate image is selected is smaller than a predetermined threshold value and each of ridge line candidate images in each of two-dimensional local regions from which an optimum candidate image is selected, corresponding to at least one of the average of the difference of the directions of two-dimensional sine waves that represent each of the ridge line candidate images and the average of the difference of the pitches thereof, and (m) evaluates the connectivity of ridge line candidate images in two-dimensional local regions that are disposed adjacently or in the vicinity thereof corresponding the evaluated results and selects a ridge line candidate image with the highest connectivity as an optimum ridge line candidate image.

To extract ridge lines from an image including wrinkles that extend and go side by side at equal pitches without influence of the wrinkles, a plurality of candidate images that represent ridge lines are extracted from each local region. An candidate image with the most likelihood of a ridge line is selected from the candidate images for each local region. The extracted candidate images are referred to as first ridge line candidate images.

Next, a local region of which a first ridge line candidate image represents a true ridge line is found. A group of such local regions is referred to as initial local region group. Only ridge lines in local regions included in the initial local region group are restored with first ridge line candidate images in the local regions.

When ridge line images are extracted in such a manner, the first ridge line candidate images in the local regions included in the initial local region group tend to represent ridge lines rather than wrinkles. Thus, with such a technique, only portions that represent ridge lines are probably restored. Consequently, ridge line images can be obtained with high reliability.

In the above description, an initial local region group with high reliability is found and the ridge lines only are restored therefrom in a non-drawing memory. However, ridge lines may be extracted from other regions.

Practically, assuming that first ridge line candidate images in an initial local region group correctly represent ridge lines, images that represent ridge lines are selected from ridge line candidate images in local regions not included in the initial local region group. At this point, images that represent ridge lines are successively selected from local regions most close to the initial local region group. The connectivity of each first ridge line candidate image of each local region included in the initial local region group and each candidate image in each local region that has formerly been selected is evaluated. An candidate image with the highest connectivity is selected. In each local region included in the initial local region group, it is assumed that each first ridge line candidate image in the local region represents a ridge line. In each local region that is not included in the initial local region group, it is assumed that each ridge line candidate image selected in the above-described method represents a ridge line.

In other words, as long as a portion represents a ridge line, it is detected. In addition, other portions of the ridge line is determined corresponding to the connectivity with the detected portion. Since there is no connectivity between a wrinkle and a ridge line, with such a technique, even if a wrinkle and a ridge line overlay, a ridge line candidate image that represents a ridge line rather than a ridge line candidate image that a wrinkle can be selected.

To restore ridge lines with higher reliability, ridge line candidate images that have formerly been selected may be verified.

In reality, the above-described process is performed once. Thereafter, the connectivity of ridge line candidate images that have been selected are evaluated again. Local regions with high connectively are clustered into one group. The likelihood of clustered ridge lines is determined so as to obtain an initial local region group. Ridge line candidate images are selected from each of local regions that are not included in the initial local region group. The connectivity of the selected ridge line candidate images are determined and then the above-described process is performed. By repeating such a process several times, with ridge line candidate images that have been finally obtained, ridge line images are restored.

Ridge line candidate images that have been selected include more ridge line images than first ridge line candidate images that have been selected first time. Thus, when an initial local region block is obtained for ridge line candidate images that have been selected first time is obtained, the area of ridge line images becomes larger than that of the ridge line candidate images that have been selected first time. Thus, it is high probability that ridge line candidate images selected from the local region block probably represent ridge lines. Thus, portions selected corresponding to the ridge line candidate images tend to accurately represent ridge lines. Consequently, ridge lines can be restored with higher reliability. When ridge line candidate images are selected from local regions that are not included in the initial local region group, since wide regions corresponding to the ridge line candidate image have been obtained, an improper selection that has been made does not influence the other selections.

Ridge lines are locally well approximated with two-dimensional sine waves. Thus, a ridge line in each local region is modeled with a two-dimensional sine wave. At this point, to extract ridge line candidate images from images in local regions, several sine waves that well approximate the local regions are extracted.

To extract such sine waves, images in local regions are Fourier transformed. Several peaks of the power spectra are extracted in the order of the maximum amplitude or the maximum energy near peak. It is assumed that sine waves corresponding to the extracted peaks are ridge line candidate images.

When an image whose pixel value is a real number is Fourier transformed, since the resultant pattern of it's powerspectrum becomes symmetrical with respect to the origin, there is another peak with the same size as the original peak at the position symmetrical with respect to the origin. Thus, a two-dimensional sine wave image with real numbers corresponding to these two peaks is determined. The peaks that exist at the position symmetrical with respect to the origin are treated as the same peak. Thus, when a plurality of peaks are extended, a plurality of peaks are extracted so that they are not symmetrical with respect to the origin.

Thus, when a plurality of sine waves are selected, even in a portion of which a ridge line and a wrinkle overlay, not only the component of the wrinkle but the component of the ridge line can be extracted. In addition, since ridge lines are approximated with sine waves, information of directions, pitches, and phases of ridge lines can be easily handled.

When ridge lines are approximated with sine waves, periodical patterns of other than ridge lines and wrinkles hardly take place in fingerprint/palmprint images. Thus, in a portion of which there is a ridge line, not a wrinkle, a peak with a large amplitude representing a ridge line and many small peaks representing noise are observed on Fourier plane. In a portion of which there is a wrinkle, a ridge line and a wrinkle are observed as large peaks, whereas other components are observed as small peaks.

The amplitudes of a wrinkle and a ridge line vary image by image. However, since characteristics of wrinkles are locally similar to characteristics of ridge lines, the wrinkles and ridge lines have the maximum amplitudes at the same frequency. Thus, a peak with large amplitude tends to individually represent a ridge line. Consequently, when a sine wave corresponding to a peak with the maximum amplitude is selected, a ridge line candidate image that represents a ridge line can be effectively selected.

As a scale of the connectivity by the connectivity evaluating means, the following can be used.

(1) the difference of the directions of sine waves that represent first ridge line candidate images in adjacent two-dimensional local regions, (2) the difference of the phases of sine waves that represent first ridge line candidate images in adjacent two-dimensional local regions, (3) the difference of the pitches of sine waves that represent first ridge line candidate images in adjacent two-dimensional local regions, and (4) the difference of the pixel values of sides of which adjacent two-dimensional local regions contact of sine waves that represent first ridge line candidate image in the adjacent two-dimensional local regions.

The directions and pitches of ridge lines gradually vary. In addition, the phases of ridge lines also gradually vary except for feature points such as edge points and branch points and in the vicinity of singular points such as cores and deltas. Moreover, pixel values also gradually vary between local regions except for feature points. Thus, when the difference of the directions, pitches, phases, and pixel values of sine waves in adjacent local regions is observed, it can be determined whether they are connected or one of them is a wrinkle or noise.

Since palmprint images have wrinkles whose local characteristics are similar to those of ridge lines, it is difficult to determine whether first ridge line candidate images in local regions are ridge lines, wrinkles, or noise with only information in the local regions. To perform such estimation for first ridge line candidate images in local regions, ridge lines and wrinkles should be observed in a wide range. To do that, in the present invention, the following technique is used.

First of all, the connectivity of features of ridge lines represented by first ridge line candidate images between each adjacent local region is evaluated so as to determine whether they are connected or not. Local regions that have been determined as connected local regions are clustered to a local region group. The local region group is structured in such a manner that assuming that each local region is treated as a node and there is a branch between adjacent local regions that have connectivity, there is always a path between nodes corresponding to any two local regions included in the same local region group and there is not a path between nodes corresponding to two local regions that are not included in the same local region group. Structuring of such a local region group is referred to as clustering.

Next, it is determined whether or not a first ridge line candidate image of each local region included in each local region group is an image that represents a ridge line. When first ridge line candidate images in adjacent local regions represent ridge lines or successive wrinkles, the connectivity of the features of ridge lines of both becomes high. Thus, in a local region group of which it has been determined that its first ridge line candidate images are connected, the first ridge line candidate image represent ridge lines all or wrinkles. Thus, it is considered that the ridge lines or wrinkles are successive. Consequently, it is sufficient to determine whether or not the first ridge line candidate images in the local region group are ridge lines.

The likelihood of a ridge line in each local region group is evaluated with one of the following feature amounts.

(5) the number of local regions included in the local region group, (6) the connectivity of first ridge line candidate images in local regions included in the local region group, (7) the ratio of the energy of an image represented by a first ridge line candidate image in a local region included in the local region group and the energy of an original image corresponding to the local region, and (8) the ratio of the sum of the energy of images represented by first ridge line candidate images in local regions included in the local region group and the sum of the energy of ridge line candidate images with the maximum energy other than the first ridge line candidate images in local regions included in the local region group. Next, these feature amounts will be described one after the other.

The feature amount (5) is conducted from the following theory.

In a portion of which wrinkles with characteristics similar to ridge lines are present in a palmprint, two wrinkles with similar intensity tend to intersect. In this case, ridge lines too tends to exist. When the components of the wrinkles are stronger than the components of the ridge lines, a first ridge line candidate image in each local region is one of the two wrinkles that intersect.

However, since the two wrinkles that intersect have the similar intensity, it is not clear which of the two wrinkles is a first ridge line candidate image. Thus, in this portion, one of the two wrinkles does not become a first ridge line candidate image in a wide range. Instead, the two wrinkles are mixed.

Thus, in such a wrinkle portion, the size of the local region group obtained by the connectivity evaluating process does not become large. In other words, many small local region groups are formed.

On the other hand, in a portion of which a ridge line is clearly present without many wrinkles, the ridge line becomes a first ridge line candidate image. Thus, the size of the local region group becomes large. In other words, candidate images that represent wrinkles tend to become a small local region group. In contrast, candidate images that represent ridge lines tend to become a large local region group.

Thus, as the number of local regions that structure a local region group is large, the tendency of which a first ridge line candidate image in each local region that structures the local region group represents a ridge line becomes strong.

Next, the feature amount (6) will be described.

The connectivity of a wrinkle portion between local regions is slightly lower than that of a ridge line therebetween. Ridge lines are densely present on the skin. The spacial variations of the directions and pitches of the ridge lines are gradual. In contrast, since wrinkles are not densely present on the skin, the connectivity of adjacent wrinkles is lower than that of ridge lines.

Thus, since the connectivitys between local regions are estimated in each local region group that structure ridge lines and wrinkles, as the value of which the amount that represents the connectivity such as the difference of the directions or pitches is normalized with a number of local regions which are contained in each local region group is small, the tendency of a ridge line is high.

The feature amount (7) represents the amount of the component of a first ridge line candidate image contained in an image in each local region.

As the feature amount (7) is small, the component other than a first ridge line candidate image is contained large. In such a local region, a wrinkle is included. Alternatively, an image of ridge lines is broken or unclear. Thus, the tendency of which a first ridge candidate image is a ridge line is low.

Next, the feature amount (8) will be described.

If a local region includes a wrinkle, it must be an candidate with large energy. At a portion where a fingerprint or a palmprint is present, ridge lines are present where wrinkles are present. Thus, in such a local region, two or three candidate with large energy are present.

In a region of which only a ridge line rather than a wrinkle is present, a ridge line candidate image other than a first ridge line candidate image has only small energy. Thus, as the value of which the sum of the energy of first ridge line candidate images in a local region group to be determined is divided by the sum of the energy of ridge line candidate images other than the first ridge line candidate images is large, the tendency of which a wrinkle is not present becomes high. Thus, the tendency of which a first ridge candidate image represents a ridge line becomes high.

In the present invention, a local region group that is a group of local regions of which a first ridge line candidate image represents a ridge line is obtained with the above-described feature amounts.

Next, a ridge line candidate image selecting technique according to the present invention will be described.

In the following description, a local region of which the cluster evaluating means has determined that a first ridge line candidate image represents a ridge line is referred to as an initial local region.

An optimum ridge line candidate image is successively selected from local regions adjacent to an initial local region. The selecting manner in each of local regions is performed in the following manner.

The connectivity of the directions, pitches, phases, and pixel values of each ridge line candidate image in a local region to be selected, and each first ridge line candidate image in the initial local region in the vicinity of the local region is determined. And the optimum ridge line candidate image in each local region that has formerly been selected is determined.

As described above, since the directions, pitches, and phases of ridge lines of a fingerprint/palmprint gradually vary, the difference of the directions, pitches, and phases of ridge line candidate images in two local regions disposed in the vicinity on the screen becomes small. In addition, the pixel values of ridge line candidate images that represent ridge lines between adjacent two local regions successively vary. Thus, the difference of the pixel values of the adjacent portions becomes small. A first ridge line candidate image in the initial local region or the optimum ridge line candidate image in each local region that has formerly been selected tends to represent a ridge line.

Thus, a ridge line candidate image of which the difference of the directions, pitches, phases, and pixel values of the adjacent portions of a first ridge line candidate image in the initial local region and a optimum ridge line candidate image in the local region that has been selected become small and where the first ridge line candidate image and the ridge line candidate image are disposed adjacently or in the vicinity tends probably to represent a ridge line. Thus, with such a selecting technique, ridge line candidate images that represent ridge lines can be accurately selected.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, embodiments of the present invention will be described.

Figure 1:
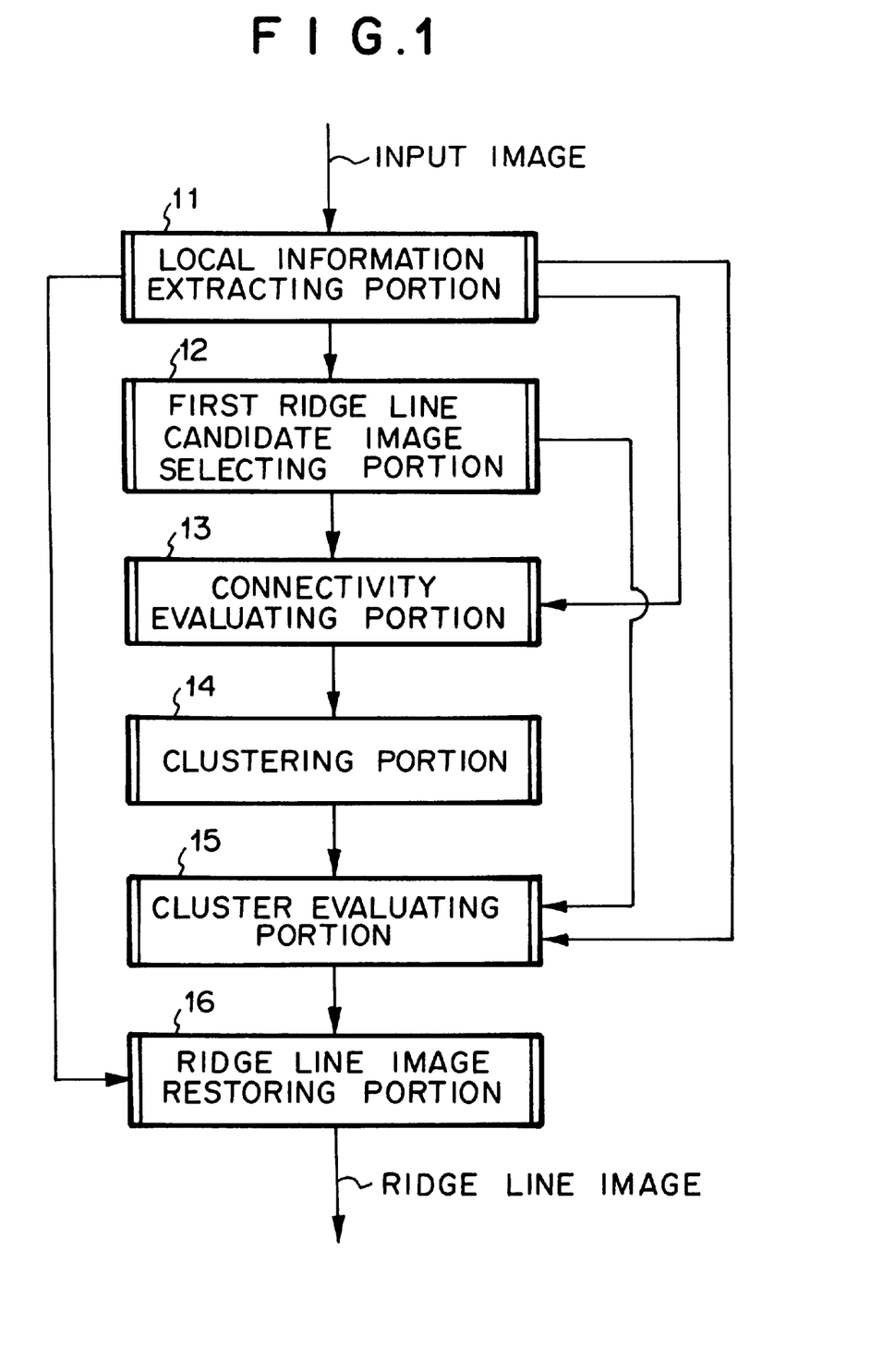
FIG. 1 is a block diagram showing an example of a fingerprint/palmprint image processing apparatus according to the present invention.

FIG. 1 shows a structure of a fingerprint/palmprint image processing apparatus according to the present invention. The fingerprint/palmprint image processing apparatus comprises a local information extracting portion 11, a first ridge line candidate image selecting portion 12, a connectivity evaluating portion 13, a clustering portion 14, a cluster evaluating portion 15, and a ridge line image restoring portion 16. The local information extracting portion 11 divides an input image into two-dimensional local regions and extracts a plurality of candidate images that represent ridge lines in the local regions (the extracted candidate images are referred to as ridge line candidate images). The first ridge line candidate image selecting portion 12 evaluates grades of the likelihood of a ridge line for each of the ridge line candidate images extracted in each local region and selects one first ridge line candidate image that has the maximum likelihood of a ridge line for each local region. The connectivity evaluating portion 13 evaluates the connectivity of first ridge line candidate images between each local region. The clustering portion 14 generates a local region group that is a group of local regions with high connectivity of first ridge line candidate images evaluated by the connectivity evaluating portion 13. The cluster evaluating portion 15 evaluates the likelihood of a ridge line for first ridge line candidate image in each local region included in the local region group generated by the clustering portion 14 and determines an initial local region group that is a local region group with high likelihood of a ridge line. The ridge line image restoring portion 16 outputs as a ridge line image a first ridge line candidate image in each local region included in the initial local region group.

Figure 2:
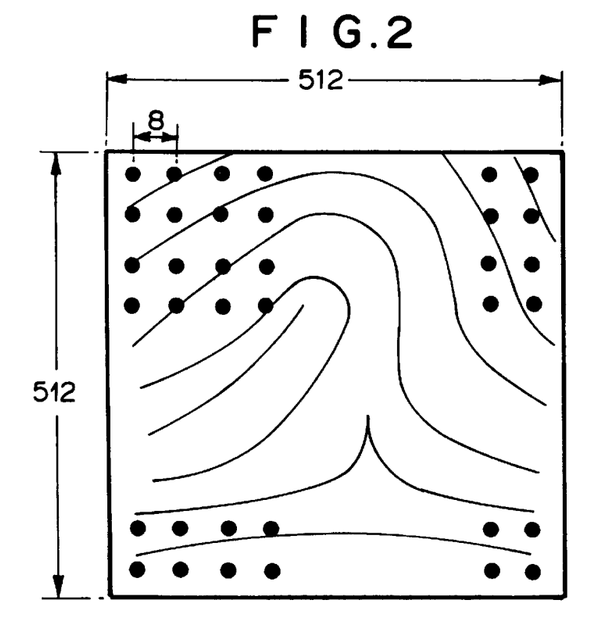
FIG. 2 is a schematic diagram showing an input image (fingerprint/palmprint image)

For example, the local information extracting portion 11 divides a digital image of a skin pattern into local regions. The skin pattern such as a fingerprint or a palmprint is photographed by an image input unit such as a scanner or a TV camera. In the description that follows, it is assumed that an input image is photographed with a resolution of 512× 512 pixels at 20 dots/mm and each local region has 8×8 pixels as shown in FIG. 2. Further, an input image may be processed in the case of other resolutions, other image sizes, and local region sizes.

Figure 3:
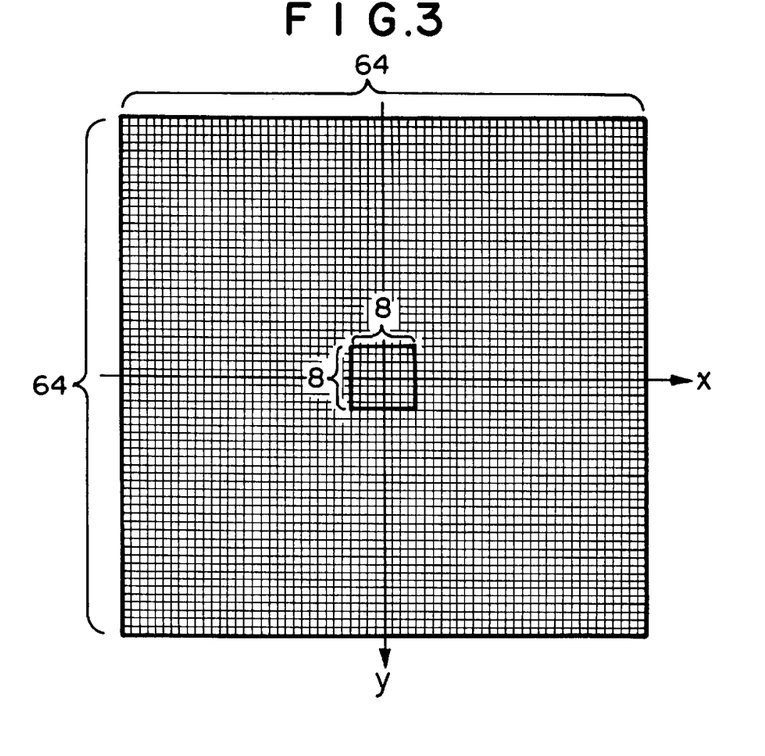
FIG. 3 is a schematic diagram showing an example of a local image.

Next, to extract ridge line image candidates, each local image with a predetermined width at the center of each local region is Fourier-transformed. This process is exemplified with a local image of 64×64 pixels as shown in FIG. 3. A pixel that is disposed at the 32-nd column position and at the 32-nd row position counted from the upper left corner of each local image is defined as the origin. The left and right directions are denoted by x. The right direction is defined as the positive direction. The upper and lower directions are denoted by y. The lower direction is defined as the positive direction. With such a coordinate system, a local image will be described. In other words, as shown in FIG. 3, each local image has 64×64 pixels and the origin at the center position of 64×64 pixels.

It is assumed that the local image of 64×64 pixels is denoted by g(x, y) and the window function is denoted by w(x, y). The window function w(x, y) can be expressed by Formula 2.

$$w(x, y) = \frac{1}{2\pi\sigma^2} \exp\left(-\frac{x^2 + y^2}{2\sigma^2}\right) \quad \sigma = 8 \quad \text{[Formula 2]}$$

The DC component of an image of which w(x, y) is multiplied by the local image g(x, y) is subtracted from the original image. The DC component can be expressed by Formula 3. The resultant image is multiplied by w(x, y). The resultant image is expressed by Formula 4. The resultant image f(x, y) is Fourier-transformed.

$$d_c = \sum_{x=-32}^{31} \sum_{y=-32}^{31} w(x, y) g(x, y) \quad \text{[Formula 3]}$$

$$f(x, y) = w(x, y)(g(x, y) - d_c) \quad \text{[Formula 4]}$$

A plurality of peaks with $|F(\xi, \eta)|$ in the region $F(\xi, \eta)$ of which f(x, y) has been Fourier-transformed are selected in the order of the largest value of $|F(\xi, \eta)|$. The region $F(\xi, \eta)$ can be expressed by Formula 5.

$$\{\xi, \eta) \mid \xi \geq 0, \text{ and } \eta \geq 0, \text{ and } \xi > 0, \text{ and } \eta < 0\} \quad \text{[Formula 5]}$$

It is assumed that six largest peaks have been selected and the coordinates of these peaks are expressed by Formula 6.

$$\{(\xi_n, \eta_n)\}_{n=1}^{6} \quad \text{[Formula 6]}$$

where n is the peak number of a ridge line candidate image in the local region and n is 1, 2, 3, 4, 5, and 6 in the order of the largest values of $|F(\xi, \eta)|$. One point on the Fourier transform plane corresponds to one sine wave on the image plane. A ridge line can be locally well approximated with a two-dimensional sine wave. Thus, two-dimensional sine waves corresponding to these peaks are treated as ridge line candidate images in each local region.

Next, parameters that feature sine waves corresponding to peaks are calculated and recorded in the non-drawing memory. Such parameters will be exemplified.

Assuming that the coordinate value of the n-th peak in the local region $I_{ij}$ (where $0 \leq i \leq 63$, $0 \leq j \leq 63$) on Fourier plane is expressed by Formula 7, the amplitude to be calculated can be expressed by Formula 8.

$$(\xi_n^{(i,j)}, \eta_n^{(i,j)}) \quad \text{[Formula 7]}$$

$$a_n^{(i,j)} = 2\nu |F(\xi_n^{(i,j)}, \eta_n^{(i,j)})|^2 \quad \text{[Formula 8]}$$

where i=1, 2, . . . 6

The phase can be expressed by Formula 9.

$$ph_n^{(i,j)} = \tan^{-1}\left(\frac{\text{Im}\{F(\xi_n^{(i,j)}, \eta_n^{(i,j)})\}}{\text{Re}\{F(\xi_n^{(i,j)}, \eta_n^{(i,j)})\}}\right) \quad \text{[Formula 9]}$$

where i = 1, 2, ... 6

The direction can be expressed by Formula 10.

$$d_n^{(i,j)} = \tan^{-1}\left(\frac{\eta_n^{(i,j)}}{\xi_n^{(i,j)}}\right) \quad \text{[Formula 10]}$$

where i = 1, 2, ... 6

The frequency can be expressed by Formula 11.

$$f_n^{(i,j)} = \frac{1}{64}\sqrt{\left[\left(\xi_n^{(i,j)}\right)^2 + \left(\eta_n^{(i,j)}\right)^2\right]} \quad \text{[Formula 11]}$$

where i = 1, 2, ..., 6

The power in the vicinity of a peak can be expressed by Formula 12.

$$va_n^{(i,j)} = \frac{4\pi^2\sigma^4}{64^2} \sum_{(\xi,\eta) \in \{(\xi_n^{(i,j)}, \eta_n^{(i,j)})\} \text{ 8 neighborhood pos.}} 2|F(\xi,\eta)|^2 \quad \text{[Formula 12]}$$

The entire power of f (Formula 4) can be expressed by Formula 13.

$$v_t^{(i,j)} = \frac{4\pi^2\sigma^4}{64^2} \sum_{\xi=-32}^{31} \sum_{\eta=-32}^{31} |F(\xi,\eta)|^2 \quad \text{[Formula 13]}$$

Figure 4:
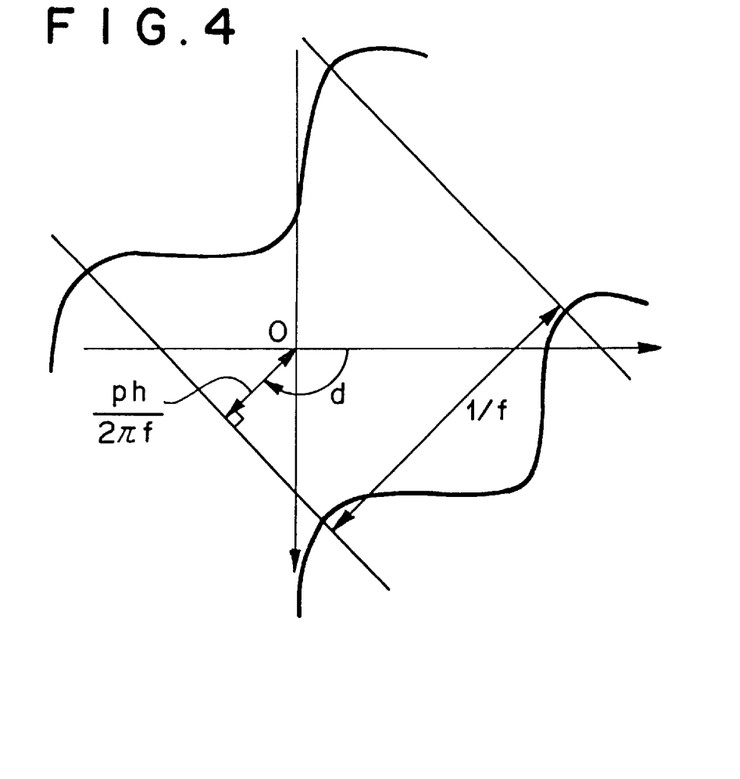
FIG. 4 is a graph for explaining the operation of the fingerprint/palmprint image processing apparatus according to the present invention.

An image determined by these parameters can be expressed by Formula 14 (see FIG. 4).

$$g_n^{(i,j)}(x, y) = a_n^{(i,j)} \cos\{2\pi f_n^{(i,j)}(x \cos(d_n^{(i,j)}) + y \sin(d_n^{(i,j)})) - ph_n^{(i,j)}\} \quad \text{[Formula 14]}$$

Formula 15 shows an candidate image that represents a ridge line of each local region.

$$\{g_n^{(i,j)}(x, y)\}_{n=1}^{6} \quad \text{[FIG. 15]}$$

The local information extracting portion 11 supplies values of parameters (expressed by Formula 16) for each local region to the first ridge line candidate image selecting portion 12, the connectivity evaluating portion 13, the cluster evaluating portion 15, and the ridge line image restoring portion 16.

$$\{\{a_n^{(i,j)}, Ph_n^{(i,j)}, d_n^{(i,j)}, f_n^{(i,j)}, va_n^{(i,j)}\}_{n=1}^{6}, v_t^{(i,j)}\}_{i=0 \ j=0}^{63\ 63} \quad \text{[Formula 16]}$$

Next, the first ridge line candidate image selecting portion 12 selects one sine wave that has the maximum likelihood of a ridge line for each local region corresponding to information of sine waves of ridge line candidate images. At this point, the connectivity with adjacent local regions is not considered, but information of considered local regions is considered. Such a sine wave is referred to as a first ridge line candidate image. To evaluate the likelihood of a ridge line, for example, the amplitude of a sine wave can be used. In other words, a sine wave with the maximum amplitude is selected as a sine wave with the maximum likelihood of a ridge line. The first ridge line candidate image selecting portion 12 supplies a two-dimensional array (expressed by Formula 17) that represents ridge line candidate images for each local region extracted by the local information extracting portion 11 to the connectivity evaluating portion 13 and the cluster evaluating portion 15.

$$\{first_{ij}\}_{i=0}{}^{63}{}_{j=0}{}^{63} \qquad \text{[Formula 17]}$$

Next, the connectivity evaluating portion 13 evaluates ridge line candidate images for each local region corresponding to Formula 17 (namely, the connectivity of individual information of first ridge line candidate images between each adjacent local region). In the following description, when four candidate images are adjacently disposed, they are treated as adjacent candidate images. However, the apparatus can be structured with a different definition of adjacent candidate images.

At this point, to perform the evaluation, four features of the connectivity of pixels, the connectivity of directions, the connectivity of pitches, and the connectivity of phases are unified. In this evaluation, two values that represent whether or not candidate images are connected are considered. Next, the connectivity of pixels, the connectivity of directions, the connectivity of pitches, and the connectivity of phases will be described one after the other.

Figure 5A:
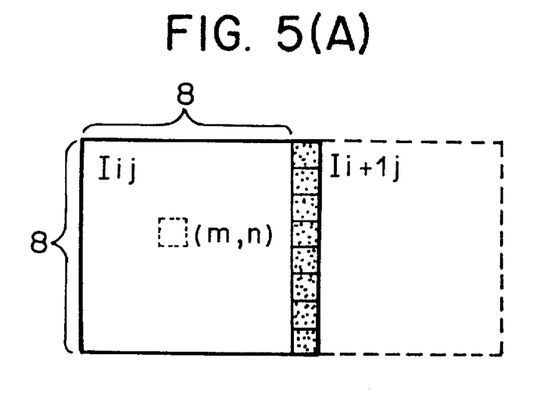
FIGS. 5(A) and 5(B) are schematic diagrams for explaining a connectivity evaluating process of pixels.
Figure 5B:
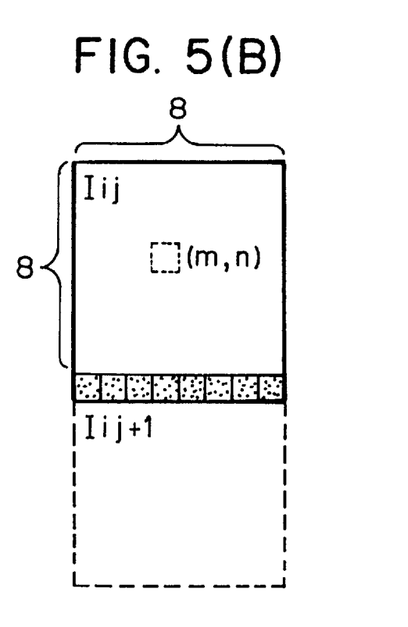

First, a method for evaluating the connectivity of pixels will be described. In this example, pixels represented by lattice points shown in FIGS. 5(A and 5B are evaluated for each region. When a local region $I_{ij}$ is restored with a first ridge line candidate image, the values of pixels that extend to a particular mesh point and the values of pixels of adjacent local regions are compared and the sum $J_1$ of each difference is obtained. The difference can be expressed by Formula 18.

$$J1 \equiv \begin{cases} \sum_{y=-4}^{5} |g_1^{(i,j)}(5, y) - g_1^{(i+1,j)}(-4, y)| \\ \text{(in the case of evaluation with} \\ \text{right adjacent local region } (I_{i+1,j})) \\ \sum_{x=-4}^{5} |g_1^{(i,j)}(x, 5) - g_1^{(i,j+1)}(x, -4)| \\ \text{(in the case of evaluation with} \\ \text{lower adjacent local region } (I_{i,j+1})) \end{cases} \quad \text{[Formula 18]}$$

Next, a method for evaluating the connectivity of directions will be described. In this example, the connectivity of directions is evaluated corresponding to the difference of directions of first ridge line candidate images in adjacent local regions. When the difference is small, it is considered that the first ridge line candidate images are connected. Otherwise, when the difference is large, it is considered that the first ridge line candidate images are not connected. The difference of the directions of the first ridge line candidate images can be expressed by Formula 20 with a parameter (expressed by Formula 19) that represents the direction of a sine wave of a first ridge line candidate image in a two-dimensional local region $I_{ij}$.

$$d_1^{Iij} \qquad \text{[Formula 19]}$$

$$J_2 \equiv \begin{cases} |d_1^{(i,j)} - d_1^{(i+1,j)}| \bmod \pi \\ \text{(in the case of evaluation with} \\ \text{right adjacent local region } (I_{i+1,j})) \\ |d_1^{(i,j)} - d_1^{(i,j+1)}| \bmod \pi \\ \text{(in the case of evaluation with} \\ \text{lower adjacent local region } (I_{i,j+1})) \end{cases} \quad \text{[Formula 20]}$$

Next, a method for evaluating the connectivity of pitches will be described. In this example, the connectivity of pitches is evaluated corresponding to the difference of the pitches of sine waves that represent first ridge line candidate images in adjacent local regions. When the difference is small, it is considered that the first ridge line candidate images are connected. Otherwise, when the difference is large, it is considered that the first ridge line candidate images are not connected. Since a pitch is the inverse number of a frequency, the difference of the pitches can be expressed by Formula 22 with the frequency (expressed by Formula 21) of sine waves that represent the first ridge line candidate images in a region $I_{ij}$.

$$f_1^{(i,j)} \qquad \text{[Formula 21]}$$

$$J_3 \equiv \begin{cases} \left| \dfrac{1}{f_1^{(i,j)}} - \dfrac{1}{f_1^{(i+1,j)}} \right| \\ \text{(in the case of evaluation with} \\ \text{right adjacent local region } (I_{i+1,j})) \\ \left| \dfrac{1}{f_1^{(i,j)}} - \dfrac{1}{f_1^{(i,j+1)}} \right| \\ \text{(in the case of evaluation with} \\ \text{lower adjacent local region } (I_{i,i+1})) \end{cases} \quad \text{[Formula 22]}$$

Next, a method for evaluating the connectivity of phases will be described. The phase of a sine wave is equal to what the minimum distance between the origin of the local coordinate system of each local region and a set of points with the maximum value of a sine wave is multiplied by $2\pi$ and the frequency of the sine wave. Thus, when different local regions are compared, those values directly should not be compared, but they should be converted into one of their coordinate systems. In this example, when a local region $I_{ij}$ is compared with an adjacent local region thereof, the coordinate system of the adjacent local region is converted into that of the local region $I_{ij}$ and the difference thereof is obtained. Assuming that the phase of an n-th peak of a local region $I_{i+1,j}$ is expressed by Formula 23 and the phase of the first peak of a local region $I_{i,j+1}$ is expressed by Formula 24, the phase of the local regions $I_{i+1,j}$ and $I_{i,j+1}$ that has been converted into the coordinate system of the local region $I_{ij}$ can be expressed by Formula 25.

$$Ph_n^{(i+1,\,j)} \qquad \text{[Formula 23]}$$

$$Ph_n^{(i,\,j+1)} \qquad \text{[Formula 24]}$$

$$Ph_n^{(i+1,j)} \rightarrow ph_n^{(i+1,j)} \text{ (new)} = \qquad \text{[Formula 22]}$$

-continued $$\begin{cases} \{(ph_n^{(i+1,j)} - 2\pi rf_n^{(i+1,j)} \cos(d_n^{(i+1,j)}))\bmod 2\pi\} \\ (ph_n^{(i+1,j)} - 2\pi rf_n^{(i+1,j)} \cos(d_n^{(i+1,j)}))\bmod 2\pi < \pi) \\ \{(ph_n^{(i+1,j)} - 2\pi rf_n^{(i+1,j)} \cos(d_n^{(i+1,j)}))\bmod 2\pi\} - 2\pi \\ (ph_n^{(i+1,j)} - 2\pi rf_n^{(i+1,j)} \cos(d_n^{(i+1,j)}))\bmod 2\pi \geq \pi) \end{cases}$$

$$Ph_n^{(i,j+1)} \to ph_n^{(i,j+1)} \text{ (new)} =$$

$$\begin{cases} \{(ph_n^{(i,j+1)} - 2\pi rf_n^{(i,j+1)} \sin(d_n^{(i,j+1)}))\bmod 2\pi\} \\ (ph_n^{(i,j+1)} - 2\pi rf_n^{(i,j+1)} \sin(d_n^{(i,j+1)}))\bmod 2\pi < \pi) \\ \{(ph_n^{(i,j+1)} - 2\pi rf_n^{(i,j+1)} \sin(d_n^{(i,j+1)}))\bmod 2\pi\} - 2\pi \\ (ph_n^{(i,j+1)} - 2\pi rf_n^{(i,j+1)} \sin(d_n^{(i,j+1)}))\bmod 2\pi \geq \pi) \end{cases}$$

where r is the length of one side of a local region. In this example, r is 8. The converted phase is compared with the phase of $I_{ij}$ corresponding to Formula 24. In other words, the difference of the phases of the first peak can be expressed by Formula 26.

$$J4 \equiv \begin{cases} |ph_1^{(i,j)} - ph_1^{(i+1,j)} \text{ (new)}| \bmod \pi \\ \text{(in the case of evaluation of} \\ \text{right adjacent local region)} \\ |ph_1^{(i,j)} - ph_1^{(i,j+1)} \text{ (new)}| \bmod \pi \\ \text{(in the case of evaluation of} \\ \text{lower adjacent local region)} \end{cases} \quad [\text{Formula 26}]$$

By unifying four feature amounts $J_1$, $J_2$, $J_3$, and $J_4$, the connectivity of local regions is evaluated. As a method for unifying these feature amounts, Formula 27 can be used.

$J_1 < TH_{pixel}$ and $J_2 < TH_{dir}$ and $J_3 < TH_{pitch}$ and $J_4 < TH_{phase} \to$ connected Otherwise $\to$ Not connected [Formula 27]

In Formula 27, it is determined that only when all the connectivity of pixels, the connectivity of directions, the connectivity of pitches, and the connectivity of phases of adjacent local regions are satisfied, they are connected. Next, one set of threshold values is exemplified as Formula 28.

$$TH_{pixel} = 3, TH_{dir} = \frac{\pi}{8}, TH_{pitch} = 2, TH_{phase} = \frac{\pi}{4} \quad [\text{Formula 28}]$$

Such evaluations are performed for all sides of all adjacent local regions. Information representing the connectivity of each side is supplied to the clustering portion 14.

The clustering portion 14 clusters local regions that have been determined as connected local regions in the adjacent local regions as the result of the connectivity evaluation by the connectivity evaluating portion 13 and generates a local region group.

Practically, a graph of which local regions are treated as nodes and adjacent local regions that have connectivity are branched is considered. In this case, a path is always disposed between nodes corresponding to any two local regions included in the same local region group. Otherwise, no path is disposed. The process for structuring such a local region group is referred to as "clustering" process.

Next, an example of the clustering method will be described. As an evaluated result of the connectivity by the connectivity evaluating portion 13, a local region group that is surrounded by a not-connected side and edge sides of an image as a closed region is extracted. Local regions in the same closed region are extracted as one local region group. In the following description, as an evaluated result of the connectivity, sides of local regions that has been determined as not-connected sides and edge sides of images are referred to as connection failure sides.

First, connection failure sides that are connected are grouped as a connection failure side group. Thereafter, the connection failure side group is categorized as closed regions and open regions. The closed regions are assigned serial numbers. The closed regions each become local region groups. label$_{ij}$ represents a two-dimensional array of label numbers of local region groups included in a local region $I_{ij}$ as expressed by Formula 29. The two-dimensional array is supplied to the cluster evaluating portion 15.

$$\{\text{label}_{ij}\}_{i=0\ j=0}^{63\ \ 63} \quad [\text{Formula 29}]$$

The cluster evaluating portion 15 evaluates the likelihood of a ridge line of a first ridge line candidate image in each local region included in each local region group generated by the clustering portion 14 and determines an initial local region group that is a local region group with high likelihood of a ridge line.

In reality, the number of local regions that structures each local region group is calculated. Several local region groups are determined as initial local region groups in the order of the largest number of local regions. In this example, four local region groups are determined as initial local region groups in the order of the largest number of local regions. When a local region $I_{ij}$ structures an initial local region group, a number that represents a first ridge line candidate image is set to a two-dimensional array (expressed by Formula 30). When the local region $I_{ij}$ does not structure an initial local region group, "0" is set to the two-dimensional array (expressed by Formula 30). The two-dimensional array is supplied to the ridge line image restoring portion 16.

$$\{\text{peak}_{ij}\}_{i=0\ j=0}^{63\ \ 63} \quad [\text{Formula 30}]$$

The ridge line image restoring portion 16 outputs a ridge line candidate image corresponding to a number being stored in the two-dimensional array (Formula 30) supplied by the cluster evaluating portion 15 for each local region $I_{ij}$. The image is calculated and restored corresponding to Formulas 30 and 14 with the parameter group supplied by the local information extracting portion 11. However, when the value of peak$_{ij}$ is 0, since a ridge line is not extracted from the local region, an image is not restored from this region. The ridge line image restoring portion 16 outputs the resultant image as the final result.

In such a manner, a ridge line image is obtained from the input fingerprint/palmprint image.

Next, a fingerprint/palmprint image processing apparatus according to a second embodiment of the present invention will be described.

Figure 6:
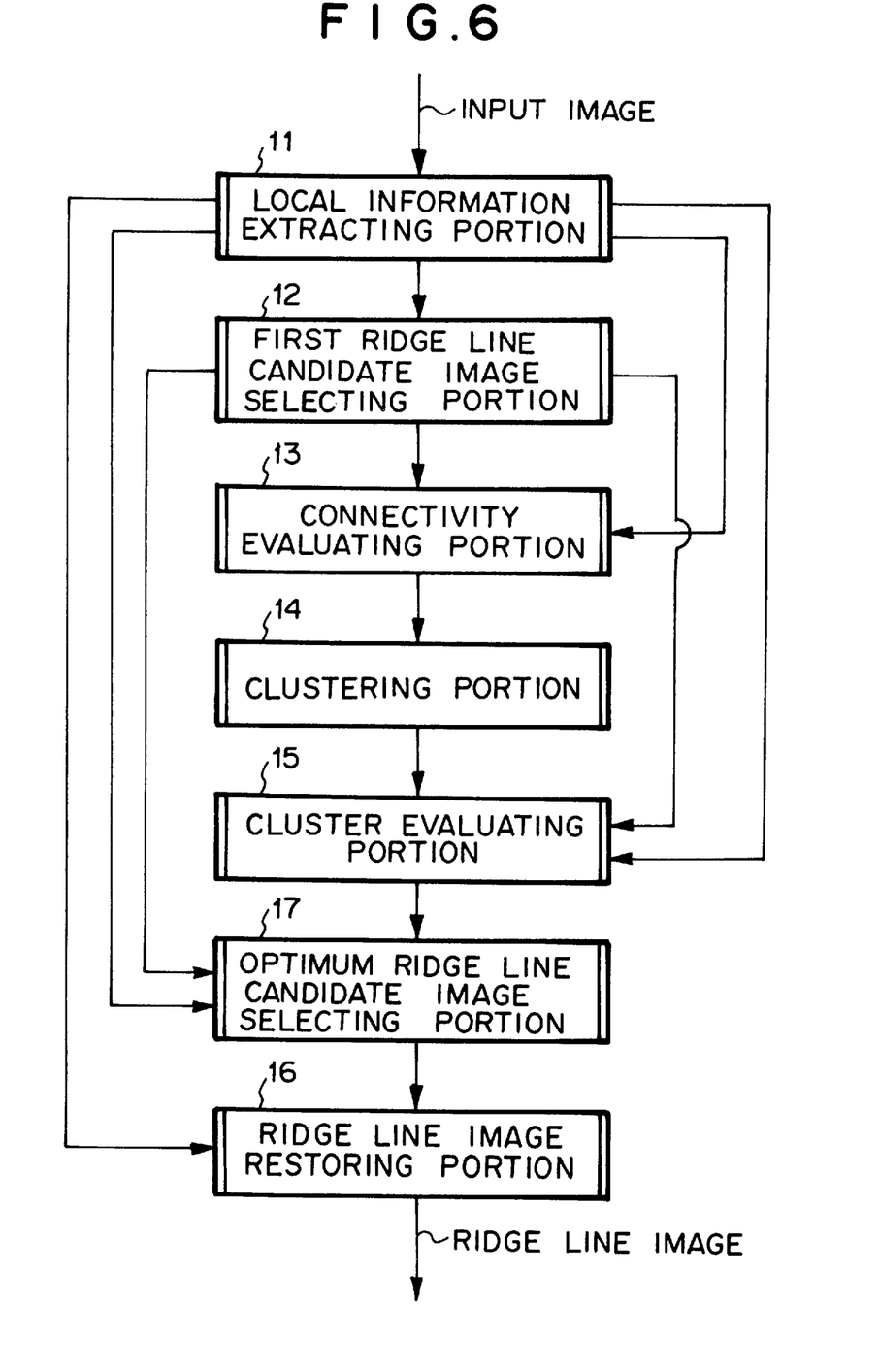
FIG. 6 is a block diagram showing another example of the structure of the fingerprint/palmprint processing apparatus according to the present invention.

FIG. 6 shows the structure of the fingerprint/palmprint image processing apparatus according to the second embodiment of the present invention. A local information extracting portion 11, a first ridge line candidate image selecting portion 12, a connectivity evaluating portion 13, a clustering portion 14, and a cluster evaluating portion 15 of fingerprint/palmprint image processing apparatus according to the second embodiment perform the same processes as those of the apparatus shown in FIG. 1. In other words, the processes of until initial local region groups are determined are the same as those of the fingerprint/palmprint image processing apparatus shown in FIG. 1.

In this example, the cluster evaluating portion 15 supplies a label number of a local region group determined as an initial local region group to an optimum ridge line candidate image selecting portion 17. The optimum ridge line candidate image selecting portion 17 selects a ridge line candidate image in each local region that is not included in the initial local region group determined by the cluster evaluating portion 15.

Figure 7:
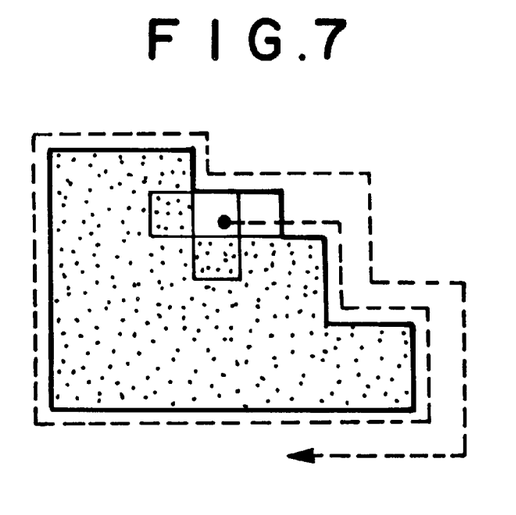
FIG. 7 is a schematic diagram for explaining the selecting order of candidate images selected by an optimum ridge line candidate image selecting portion.

First, the selecting order of ridge line candidate images will be described. First, the optimum ridge line candidate image selecting portion 17 selects local regions adjacent to a local region included in the initial local region group determined by the cluster evaluating portion 15. When there is no more adjacent local region, the optimum ridge line candidate image selecting portion 17 selects local regions adjacent to the local region that has been selected. The optimum ridge line candidate image selecting portion 17 repeats this process until all local regions are selected (see FIG. 7).

Next, an evaluating method for selecting local regions will be described. Local regions are selected from adjacent local regions with the connectivity of (1) first ridge line candidate images in local regions included in an initial local region and (2) optimum ridge line candidate images in local regions that have been selected at the point in time.

In the following description, as a definition of adjacent local regions, local regions that are disposed adjacent to at least one of four sides of a particular local region are treated as local regions. However, the apparatus can be structured with another definition of adjacent local regions.

A ridge line candidate image for which the connectivity is evaluated is a ridge line candidate image with a number of a two-dimensional array (expressed by Formula 30). A local region included in the initial local region is a first ridge line candidate image. A local region which has been selected at the point is a ridge line candidate image for which the connectivity is evaluated. The connectivity of such ridge line candidate images and a plurality of ridge line candidate images in a local region to be selected is evaluated. One ridge line candidate image with good connectivity is selected from such ridge line candidate images.

In this example, the case of which six ridge line candidate images are selected at a time will be described. Numbers corresponding to selected ridge line candidate images are set to the two-dimension array (expressed by Formula 30). The connectivity of each ridge line candidate image is evaluated with four feature amounts that will be described in the following. The first feature amount is the connectivity of the directions of a local region to be evaluated and four local regions adjacent thereto. The difference of the parameter that represents the direction of each of the four adjacent local regions included in the initial local region group or each two-dimensional sine wave that represents a ridge line candidate image corresponding to a number stored in a two-dimensional array (expressed by Equation 30) in each local region that has been selected and the parameter that represents the direction of each ridge line candidate image in each local region to be selected is calculated for all ridge line candidate images in each local region. It is assumed that the sum of absolute values of the difference of the directions with an n-th ridge line candidate image in each local region to be selected is denoted by $J1_n$.

The second feature amount is the connectivity of pitches of a local region to be evaluated and each of four local regions adjacent thereto. The sum of absolute values of the difference of the pitch of each of four adjacent local regions included in the initial local region group or each two-dimensional sine wave that represents a ridge line candidate image corresponding to a number stored in the two-dimensional array (expressed by Formula 30) in each local region that has been selected and the pitch of each ridge line candidate image in each local region to be selected is calculated for all ridge line candidate images in each local region. It is assumed that the sum of the difference of the pitch of a local region to be selected and the pitch of the n-th ridge line candidate image of each local region to be selected is denoted by $J2_n$.

Figure 8:
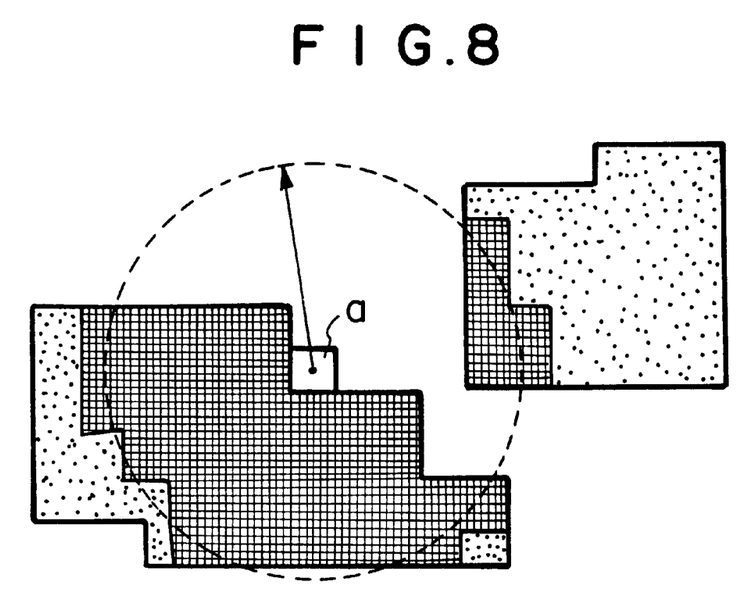
FIG. 8 is a schematic diagram for explaining a calculating process of the direction that represents a local region.

The third feature amount is the difference of the direction of a local region to be evaluated and the direction that represents local regions adjacent thereto. The direction of a local region (FIG. 7) spaced apart from a local region to be selected by a predetermined length or less or the direction of a local region that has been selected and the direction of a local region that represents these local regions are calculated (see FIG. 8). Assuming that the represented direction is denoted by d(bar) and the direction of the ridge line candidate image determined as the ridge line of the local region k is denoted by $\{d^{(k)}\}$, d(bar) can be expressed by Formula 31.

$$\bar{d} = \sum_k \frac{1}{2} \cos^{-1} \frac{\sum_k \cos 2d^{(k)}}{\sqrt{\left(\sum_k \cos 2d^{(k)}\right)^2 + \left(\sum_k \sin 2d^{(k)}\right)^2}}$$ [Formula 31]

It should be noted that when a direction that represents several local regions is calculated corresponding to another definition, the process can be performed likewise. Thus, the difference $J3_n$ of the direction of the local region to be selected and the direction of the sine wave that represents the n-th ridge line candidate image can be expressed by Formula 32.

$$J3_n = (d_n - \bar{d}) \bmod \pi$$ [Formula 32]

The fourth feature amount is the difference of the pitch of a local region to be evaluated and the average of pitches of local regions adjacent thereto. The average of pitches of local regions that are spaced apart from a local region to be selected by a predetermined length or less and that are included in an initial local region group or that have been selected is calculated. Assuming that the pitch of a sine wave that represents a ridge line candidate image that has been determined as a ridge line in each local region is denoted by $\{1/f^{(k)}\}$ and the number of local regions that are disposed within the predetermined distance and whose pitches are averaged (thus, the number of local regions that are included in the initial local region group or that have been selected) is denoted by N, the average pitch can be expressed by Formula 33.

$$\frac{\bar{1}}{f} = \frac{1}{N} \sum_k \frac{1}{f^{(k)}}$$ [Formula 33]

Thus, the difference $J4_n$ of the pitch of the local region to be selected and the pitch of the n-th ridge line candidate image can be expressed by Formula 34.

$$J4_n = \left(\frac{1}{f_n} - \frac{\bar{1}}{f}\right) \bmod \pi$$ [Formula 34]

By unifying the above-described four feature amounts, one ridge line candidate image is selected for each local region. As a unifying method, a ridge line candidate image of which $J3_n$ is minimized is selected from those that satisfy Formula 35.

$$J1_n<TH_1 \text{ and } J2_n<TH_2 \text{ and } J4_n<TH_4 \quad \text{[Formula 35]}$$

When no ridge line candidate image satisfies such conditions, it is determined that the local region does not have ridge line candidate images that represent a ridge line in the ridge line candidate image.

Next, threshold values are exemplified with Formula 36.

$$TH_1 = \frac{\pi}{8}, TH_2 = 2, TH_4 = \frac{\pi}{4}. \quad \text{[Formula 36]}$$

The two-dimensional array (expressed by Formula 30) is supplied to the ridge line image restoring portion 16. $Peak_{ij}$ represents a peak number of the local region $I_{ij}$.

Next, the ridge line image restoring portion 16 outputs a ridge line candidate image corresponding to a number stored in the two-dimensional array (expressed by Formula 30) supplied from the optimum ridge line candidate image selecting portion 17 for each local region $I_{ij}$. At this point, the ridge line image restoring portion 16 generates an image corresponding to Formula 14 with a parameter group expressed by Formula 37 supplied from the local information extracting portion 11.

$$\{\{a_n^{(i,j)}, Ph_n^{(i,j)}, d_n^{(i,j)}, f_n^{(i,j)}, va_n^{(i,j)}\}_{n=1}^{6}, vt^{(i,j)}\}_{i=0}^{63}{}_{j=0}^{63} \quad \text{[Formula 37]}$$

In such a manner, the fingerprint/palmprint image processing apparatus shown in FIG. 6 obtains a ridge line image corresponding to an input fingerprint/palmprint image.

Next, a fingerprint/palmprint image processing apparatus according to a third embodiment of the present invention will be described.

Figure 9:
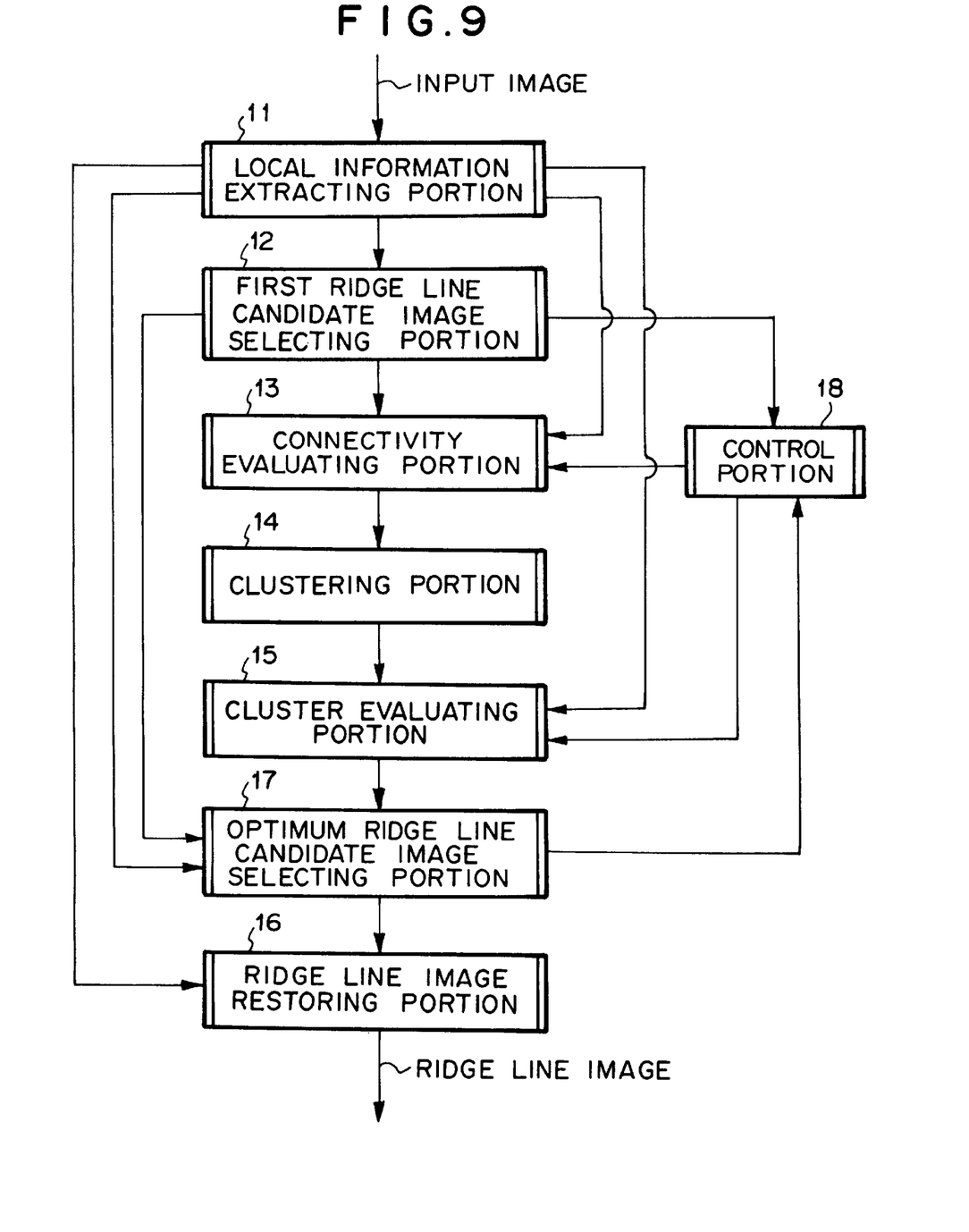
FIG. 9 is a schematic diagram showing a further example of the structure of the fingerprint/palmprint image processing apparatus according to the present invention.

In the fingerprint/palmprint image processing apparatus shown in FIG. 9, an optimum ridge line candidate image selecting portion 17 selects an image that represents a ridge line from the ridge line candidate images corresponding to the connectivity of adjacent ridge line candidate images. Thereafter, the third embodiment in the present invention recognizes and determines connectivity of the selected ridge line candidate images so as to extract and correct each local region from which incorrect ridge line candidate images have been selected. The other processes of the fingerprint/palmprint image processing apparatus according to the third embodiment are the same as those of the second embodiment shown in FIG. 6.

The same process as the fingerprint/palmprint image processing apparatus as shown in FIG. 6 is performed to the input image. However, in the third embodiment, output data of a first ridge line candidate image selecting portion 12 is supplied to a control portion 18. When the control portion 18 receives data from the first ridge line candidate image selecting portion 12, the control portion 12 directly outputs a two-dimensional array (expressed by Formula 17) to a connectivity evaluating portion 13 and a cluster evaluating portion 15.

After the output data of the optimum ridge line candidate image selecting portion 17 is obtained, the two-dimensional array (expressed by Formula 30) that is output data of the optimum ridge line candidate image selecting portion 17 is supplied to the control portion 18.

When the control portion 18 receives data from the optimum ridge line candidate image selecting portion 17, the control portion 18 copies the two-dimensional array (expressed by Formula 30) to the two-dimensional array (expressed by Formula 17) and outputs the two-dimensional array (expressed by Formula 17) to the connectivity evaluating portion 13 and the cluster evaluating portion 15. Corresponding to the data supplied from the control portion 18, the connectivity evaluating portion 13, clustering portion 14, cluster evaluating portion 15, and optimum ridge line candidate image selecting portion 17 perform respective processes.

Thereafter, the control portion 18 determines whether or not the processes should be completed. When the processes should be continued, the two-dimensional array (expressed by Formula 30) that is supplied from the optimum ridge line candidate image selecting portion 17 is supplied to the control portion 18 once again. Thus, the control portion 18 and other portions repeats the same process. When the control portion 18 has determined that the process should be completed, the optimum ridge line candidate image selecting portion 17 supplies the two-dimensional array (expressed by Formula 30) to the ridge line image restoring portion 16 so as to calculate an image to be restored.

The determination of whether the process should be completed by the control portion 18 is performed whether or not the number of times of the repeated process becomes a predetermined value or whether or not the number of local regions to be updated becomes smaller than that of an optimum ridge line candidate image that has been selected by a predetermined value.

As with the fingerprint/palmprint image processing apparatus shown in FIG. 6, the ridge line image restoring portion 16 outputs a ridge line candidate image corresponding to a number stored in the two-dimensional array (expressed by Formula 30) supplied from the optimum ridge line candidate image selecting portion 17 for each local region $I_{ij}$. At this point, with parameters supplied from the local information extracting portion 11, the ridge line image restoring portion 16 generates and outputs an image corresponding to Formula 14.

In such a manner, the fingerprint/palmprint image processing apparatus shown in FIG. 9 obtains a ridge image corresponding to an input fingerprint/palmprint image.

As described above, according to the present invention, even if there are wrinkles similar to ridge lines, a ridge line image can be accurately extracted from a skin pattern image.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A fingerprint/palmprint image processing apparatus for extracting ridge lines from an input fingerprint/palmprint image, comprising:

local information extracting means for dividing the fingerprint palmprint image into two-dimensional local regions and extracting, in each of the two-dimensional local regions, a plurality of ridge line candidate images that represent ridge lines from each of the two-dimensional local regions, each of the plurality of ridge line candidate images being represented as a sine wave with a corresponding amplitude;

first ridge line candidate image selecting means for evaluating the likelihood of a ridge line for each of the ridge line candidate images in each of the two-dimensional local regions, and selecting one first ridge line candidate image that represents a ridge line candidate image with the maximum likelihood of a ridge line from ridge line candidate images in each of the two-dimensional local regions, the selecting being made based on the one first ridge line candidate image having a maximum amplitude with respect to the ridge line candidate images in each of the two-dimensional local regions;

connectivity evaluating means for evaluating the connectivity of first ridge line candidate images selected by the first ridge line candidate image selecting means in adjacent two-dimensional local regions;

clustering means for clustering two-dimensional local regions that have high connectivity of first ridge line candidate images corresponding to the determined result of said connectivity evaluating means and generating a local region group;

cluster evaluating means for evaluating the likelihood of a ridge line for the first ridge line candidate image in each of the two-dimensional local regions in the local region group generated by said clustering means and determining a local region group that has high likelihood of a ridge line as an initial local region group; and ridge line image restoring means for outputting the first ridge line candidate image in each of two-dimensional local regions included in the initial local region group as a ridge line image.

2. A fingerprint/palmprint image processing apparatus for extracting ridge lines from an input fingerprint/palmprint image, comprising:

a local information extracting unit for dividing the fingerprint palmprint image into two-dimensional local regions and extracting, in each of the two-dimensional local regions, a plurality of ridge line candidate images that represent ridge lines from each of the two-dimensional local regions, each of the plurality of ridge line candidate images being represented as a sine wave with a corresponding amplitude;

a first ridge line candidate image selecting unit, coupled to said local information extracting unit, for evaluating the likelihood of a ridge line for each of the ridge line candidate images in each of the two-dimensional local regions, and selecting one first ridge line candidate image that represents a ridge line candidate image with the maximum likelihood of a ridge line from ridge line candidate images in each of the two-dimensional local regions, the selecting being made based on the one first ridge line candidate image having a maximum amplitude with respect to the ridge line candidate images in each of the two-dimensional local regions;

a connectivity evaluating unit, coupled to said first ridge line candidate image selecting unit and said local information extracting unit, for evaluating the connectivity of first ridge line candidate images in adjacent two-dimensional local regions;

a clustering unit, coupled to said connectivity evaluating unit, for clustering two-dimensional local regions that have high connectivity of first ridge line candidate images corresponding to the determined result of said connectivity evaluating unit and generating a local region group;

a cluster evaluating unit, coupled to said clustering unit, said first ridge line candidate image selecting unit, and said local information extracting unit, for evaluating the likelihood of a ridge line for the first ridge line candidate image in each of the two-dimensional local regions in the local region group generated by said clustering unit and determining a local region group that has high likelihood of a ridge line as an initial local region group; and a ridge line image restoring unit, coupled to said cluster evaluating unit and said local information extracting unit, for outputting the first ridge line candidate image in each of two-dimensional local regions included in the initial local region group as a ridge line image.

3. The fingerprint/palmprint image processing apparatus as set forth in claim 1, wherein said cluster evaluating means evaluates the likelihood of a ridge line in each of the local region groups corresponding to at least one of:

the number of two-dimensional local regions included in each of the local region groups, and the sum of the evaluated amount of the connectivity of first ridge line candidate images between adjacent two-dimensional local regions for each of the local region groups.

4. The fingerprint/palmprint image processing apparatus as set forth in claim 1, wherein said cluster evaluating means evaluates the likelihood of a ridge line in each of the local region groups corresponding to at least one of:

the quotient of which the sum of the energy of the first ridge line candidate image in each of the two-dimensional local regions for each of the local region groups is divided by the sum of the energy of the fingerprint/palmprint image corresponding to each of the two-dimensional local regions for each of the local region groups, and the quotient of which the sum of the energy of the first ridge line candidate image in each of the two-dimensional local regions for each of the local region groups is divided by the sum of the energy of a ridge line candidate image with the maximum energy in the ridge line candidate images other than the first ridge line candidate images for each of the local region groups.

5. The fingerprint/palmprint image processing apparatus as set forth in claim 1, wherein said cluster evaluating means evaluates the likelihood of a ridge line in each of the local region groups corresponding to the quotient of which the sum of the first ridge line candidate image in each of the two-dimensional local regions for each of the local region groups is divided by the sum of the energy of the fingerprint/palmprint image corresponding to each of the two-dimensional local regions for each of the local region groups.

6. The fingerprint/palmprint processing apparatus as set forth in claim 1, wherein said cluster evaluating means evaluates the likelihood of a ridge line in each of the local region groups corresponding to the quotient of which the sum of the energy of the first ridge line candidate image in each of the two-dimensional local regions for each of the local region groups is divided by the sum of the energy of a ridge line candidate image with the maximum energy in the ridge line candidate images other than the first ridge line candidate images for each of the local region groups.

7. The fingerprint/palmprint image processing apparatus as set forth in claim 2, wherein said cluster evaluating unit evaluates the likelihood of a ridge line in each of the local region groups corresponding to at least one of:

the number of two-dimensional local regions included in each of the local region groups, and the sum of the evaluated amount of the connectivity of first ridge line candidate images between adjacent two-dimensional local regions for each of the local region groups.

8. The fingerprint/palmprint image processing apparatus as set forth in claim 2, wherein said cluster evaluating unit evaluates the likelihood of a ridge line in each of the local region groups corresponding to at least one of:

the quotient of which the sum of the energy of the first ridge line candidate image in each of the two-dimensional local regions for each of the local region groups is divided by the sum of the energy of the fingerprint/palmprint image corresponding to each of the two-dimensional local regions for each of the local region groups, and the quotient of which the sum of the energy of the first ridge line candidate image in each of the two-dimensional local regions for each of the local region groups is divided by the sum of the energy of a ridge line candidate image with the maximum energy in the ridge line candidate images other than the first ridge line candidate images for each of the local region groups.

9. The fingerprint/palmprint image processing apparatus as set forth in claim 2, wherein said cluster evaluating unit evaluates the likelihood of a ridge line in each of the local region groups corresponding to the quotient of which the sum of the first ridge line candidate image in each of the two-dimensional local regions for each of the local region groups is divided by the sum of the energy of the fingerprint/palmprint image corresponding to each of the two-dimensional local regions for each of the local region groups.

10. The fingerprint/palmprint processing apparatus as set forth in claim 2, wherein said cluster evaluating unit evaluates the likelihood of a ridge line in each of the local region groups corresponding to the quotient of which the sum of the energy of the first ridge line candidate image in each of the two-dimensional local regions for each of the local region groups is divided by the sum of the energy of a ridge line candidate image with the maximum energy in the ridge line candidate images other than the first ridge line candidate images for each of the local region groups.

\* \* \* \* \*